(12) United States Patent
Lutz

(10) Patent No.: US 9,836,279 B2
(45) Date of Patent: *Dec. 5, 2017

(54) APPARATUS AND METHOD FOR FLOATING-POINT MULTIPLICATION

(71) Applicant: ARM LIMITED, Cambridge (GB)

(72) Inventor: David Raymond Lutz, Austin, TX (US)

(73) Assignee: ARM Limited, Cambridge (GB)

( * ) Notice: Subject to any disclaimer, the term of this patent is extended or adjusted under 35 U.S.C. 154(b) by 161 days.

This patent is subject to a terminal disclaimer.

(21) Appl. No.: 14/865,359

(22) Filed: Sep. 25, 2015

(65) Prior Publication Data

US 2017/0090869 A1    Mar. 30, 2017

(51) Int. Cl.
*G06F 7/44*     (2006.01)
*G06F 7/487*    (2006.01)
*G06F 5/01*     (2006.01)

(52) U.S. Cl.
CPC ............ *G06F 7/4876* (2013.01); *G06F 5/012* (2013.01)

(58) Field of Classification Search
CPC .................................. G06F 7/487; G06F 5/012
USPC ........................................................ 708/503
See application file for complete search history.

(56) References Cited

U.S. PATENT DOCUMENTS

| 6,490,607 B1 | 12/2002 | Oberman |
| 8,996,600 B1 | 3/2015 | Langhammer |
| 2011/0106868 A1 | 5/2011 | Lutz |

FOREIGN PATENT DOCUMENTS

WO    WO 98/06029    2/1998

OTHER PUBLICATIONS

Office Action dated Apr. 21, 2017 in co-pending U.S. Appl. No. 14/865,342, 9 pages.
U.S. Appl. No. 14/865,342, filed Sep. 25, 2015, Inventor: Lutz.
UK Combined Search and Examination Report dated Nov. 24, 2016 in GB 1610092.7, 5 pages.
UK Combined Search and Examination Report dated Nov. 24, 2016 in GB 1610091.9, 6 pages.
A.F. Tenca et al, "Performance Impact of Using Denormalized Numbers in Basic Floating-point Operations" Conference record of the Forty-First Asilomar Conference on Signals, Systems & Computers, 2007, Nov. 4-7, 2007, pp. 348-352.

*Primary Examiner* — Tan V. Mai
(74) *Attorney, Agent, or Firm* — Nixon & Vanderhye P.C.

(57) ABSTRACT

An apparatus and method for floating-point multiplication are provided. Two partial products are generated from two operand significands, which are then added to generate a product significand. The value of an unbiased result exponent is determined from the operand exponent values and leading zero counts, and a shift amount and direction for the product significand are determined in dependence on a predetermined minimum exponent value of a predetermined canonical format. The product significand is shifted by the shift amount in the shift direction. An overflow mask identifying an overflow bit position of the product significand is generated by right shifting a predetermined mask pattern by the shift amount, and the overflow mask is applied to the product significand to extract an overflow value at the overflow bit position. This extraction of the overflow value happens before the shift circuitry shifts the product significand, allowing an overall faster floating-point multiplication to be performed.

14 Claims, 8 Drawing Sheets

| prod[105:0] | 105 | 104 | 103 | ... | 54 | 53 | 52 | 51 | 50 | ... | 0 |
|---|---|---|---|---|---|---|---|---|---|---|---|
| A. normal inputs [1,2] | i | f | f | ... | f | f | L | G | s | ... | s |
| B. ovfl normal inputs [2,4] | i | f | f | ... | f | L | G | s | s | ... | s |

FIG. 1A

| prod[105:0] | 105 | 104 | 103 | ... | 105-k | ... | 53-k | 52-k | 51-k | ... | 0 |
|---|---|---|---|---|---|---|---|---|---|---|---|
| C. subnormal input [0,1] | | | | | i | f | f | L | G | s | s |
| D. ovfl sub. input [0,1] | | | | | f | f | L | G | s | s | s |

FIG. 1B

APPARATUS AND METHOD FOR FLOATING-POINT MULTIPLICATION

TECHNICAL FIELD

The present disclosure relates to a data processing apparatus. More particularly, it relates to floating-point multiplication in a data processing apparatus.

BACKGROUND

Floating-point multiplication capability may be provided in a data processing apparatus. The floating-point format for numbers is useful to be supported, in particular in view of the large range of values which it is able to represent. Accordingly, a data processing apparatus may be provided with a floating-point multiplier which is specifically provided for the purpose of handling the multiplication of such floating-point values. Various aspects of the implementation of such a floating-point multiplier are nevertheless non-trivial, especially if the multiplier is to operate quickly and efficiently, and these complexities are greater the more flexibility is allowed in the representation of an operand for the floating-point multiplication which the multiplier receives. For example, the construction of the floating-point multiplier may be simplified by constraining the representation of input operands to normalised inputs, yet more generally the floating-point values which a data processing apparatus is required to handle will not necessarily conform to this normalised representation and therefore additional capability in the input stages of the multiplier then need to be provided to convert non-normalised inputs into a normalised representation. It would be desirable to provide an improved technique for handling floating-point multiplication in a data processing apparatus.

SUMMARY

At least one embodiment provides an apparatus for floating-point multiplication comprising: partial product generation circuitry to multiply significands of a first floating-point operand and a second floating-point operand to generate first and second partial products; adder circuitry to add the first and second partial products to generate a product significand; exponent calculation circuitry to calculate a value of an unbiased exponent of a result of the multiplication in dependence on exponent values and leading zero counts of the first and second floating-point operands and to determine a shift amount and a shift direction for the product significand in dependence on a predetermined minimum exponent value of a predetermined canonical format; shift circuitry to shift the product significand by the shift amount in the shift direction in order to generate a formatted significand in the predetermined canonical format; mask generation circuitry to generate an overflow mask identifying an overflow bit position of the product significand, wherein the mask generation circuitry is arranged to generate the overflow mask by right shifting a predetermined mask pattern by the shift amount; and comparison circuitry to apply the overflow mask to the product significand to extract an overflow value at the overflow bit position, wherein the comparison circuitry is arranged to extract the overflow value before the shift circuitry shifts the product significand.

At least one embodiment provides a method of operating a data processing apparatus to perform floating-point multiplication comprising the steps of multiplying significands of a first floating-point operand and a second floating-point operand to generate first and second partial products; adding the first and second partial products to generate a product significand; calculating a value of an unbiased exponent of a result of the multiplication in dependence on exponent values and leading zero counts of the first and second floating-point operands and determining a shift amount and a shift direction for the product significand in dependence on a predetermined minimum exponent value of a predetermined canonical format; shifting the product significand by a shift amount in the shift direction in order to generate a formatted significand in the predetermined canonical format; generating an overflow mask identifying an overflow bit position of the product significand, wherein generating the overflow mask comprises right shifting a predetermined mask pattern by the shift amount; and applying the overflow mask to the product significand to extract an overflow value at the overflow bit position, wherein the extraction of the overflow value in the applying step occurs before the shifting step shifts the product significand.

At least one embodiment provides an apparatus for floating-point multiplication comprising means for multiplying significands of a first floating-point operand and a second floating-point operand to generate first and second partial products; means for adding the first and second partial products to generate a product significand; means for calculating a value of an unbiased exponent of a result of the multiplication in dependence on exponent values and leading zero counts of the first and second floating-point operands and determining a shift amount and a shift direction for the product significand in dependence on a predetermined minimum exponent value of a predetermined canonical format; means for shifting the product significand by a shift amount in the shift direction in order to generate a formatted significand in the predetermined canonical format; means for generating an overflow mask identifying an overflow bit position of the product significand, wherein generating the overflow mask comprises right shifting a predetermined mask pattern by the shift amount; and applying the overflow mask to the product significand to extract an overflow value at the overflow bit position, wherein the means for applying the overflow mask is arranged to extract the overflow value before the means for shifting shifts the product significand.

BRIEF DESCRIPTION OF THE DRAWINGS

The present techniques will be described further, by way of example only, with reference to embodiments thereof as illustrated in the accompanying drawings, in which:

FIG. 1A shows bit positions within the product significand in one embodiment when both input operands are normal for the case where the product is within range and for the case where the product significand overflows:

FIG. 1B shows bit positions within the product significand in one embodiment in the case where one of the operands is subnormal for the case where the product significand is within range and for the case where the product significand overflows;

DESCRIPTION OF EXAMPLE EMBODIMENTS

Figure 2:
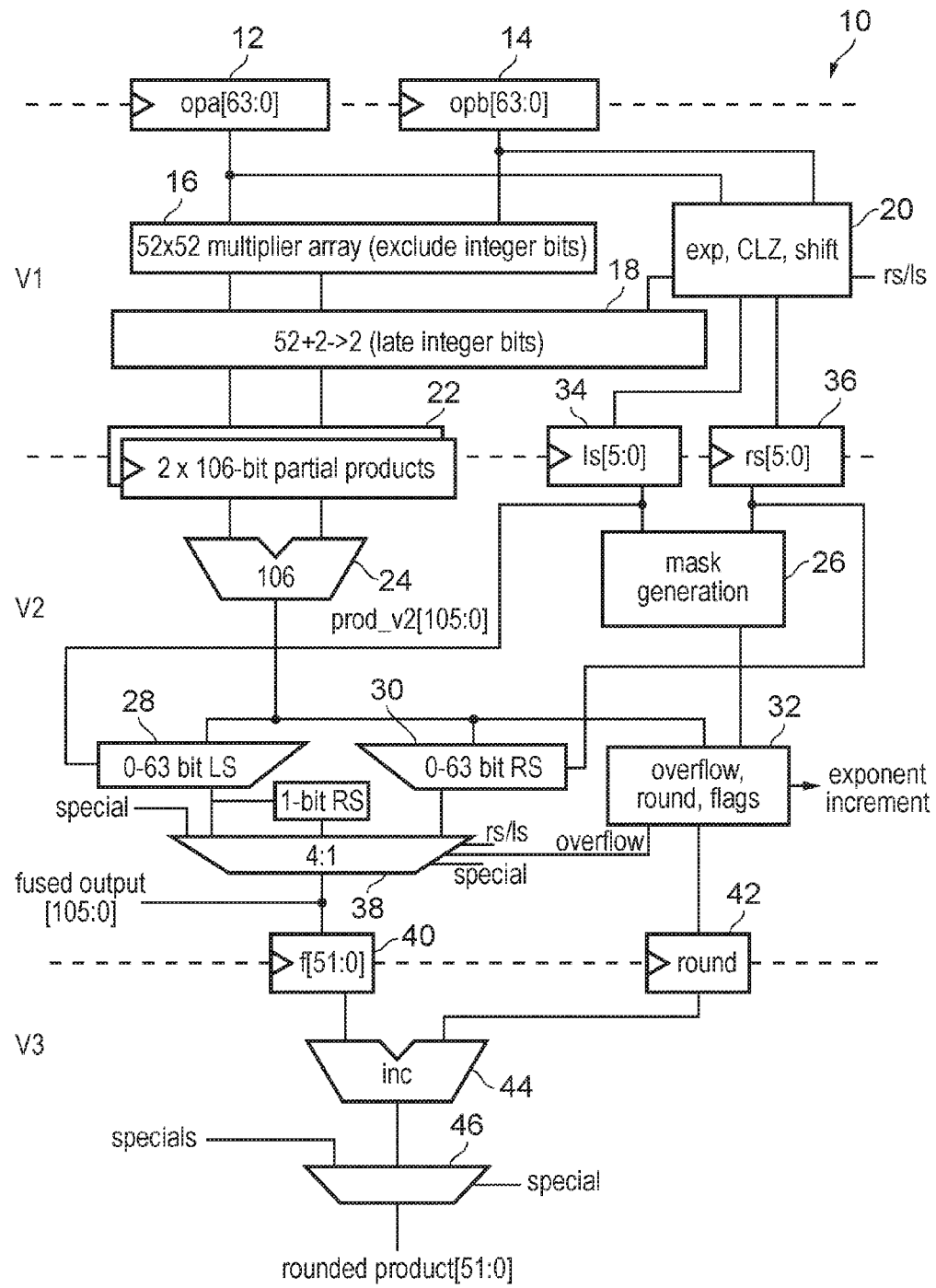
FIG. 2 schematically illustrates apparatus for floating-point multiplication in one embodiment.

At least some embodiments provide an apparatus for floating-point multiplication comprising: partial product generation circuitry to multiply significands of a first floating-point operand and a second floating-point operand to generate first and second partial products; adder circuitry to add the first and second partial products to generate a product significand; exponent calculation circuitry to calculate a value of an unbiased exponent of a result of the multiplication in dependence on exponent values and leading zero counts of the first and second floating-point operands and to determine a shift amount and a shift direction for the product significand in dependence on a predetermined minimum exponent value of a predetermined canonical format; shift circuitry to shift the product significand by the shift amount in the shift direction in order to generate a formatted significand in the predetermined canonical format; mask generation circuitry to generate an overflow mask identifying an overflow bit position of the product significand, wherein the mask generation circuitry is arranged to generate the overflow mask by right shifting a predetermined mask pattern by the shift amount; and comparison circuitry to apply the overflow mask to the product significand to extract an overflow value at the overflow bit position, wherein the comparison circuitry is arranged to extract the overflow value before the shift circuitry shifts the product significand.

The present techniques recognise that an improved apparatus for floating-point multiplication is provided, in particular in terms of the speed with which it is able to generate the product of two input floating-point operands, even if there is no constraint placed on the format in which the input operands are received (in particular that they need not be normalised), by addressing the issue of identifying whether the product significand overflows early in the computational stages of performing the multiplication. In the case that both input operands happen to be normal, the identification of whether the product significand overflows must take into account the exponents of each input operand since the presentation of the result of the floating-point multiplication in a predetermined canonical format (for example normalised, where possible, and using a biased exponent value such as is usual when generating floating-point values according to the IEEE 754-2008 FP standard). Moreover, when one input operand is subnormal the bit position within the product significand at which the overflow may be identified can vary further, thus adding to the complexity of identifying whether the product significand has overflowed when allowing both normal and subnormal input operands. Note that in the case that both input operands are subnormal this will produce an unrepresentably small product and the output value generated will not depend on whether the product significand overflows. The present techniques allow the flexibility of the input operands not being required to be normalised, and yet also allow a fast determination of the result of the floating-point multiplication, by introducing an overflow mask which identifies the bit position at which a set bit will occur in the product significand when overflow occurs and then shifting this overflow mask in the opposite direction to that in which the product significand will be shifted. In order to identify the overflow, this shifting of the overflow mask is a right shift, since it is in the case of one of the input operands being subnormal that the overflow bit position of the product significand will move depending on the required left shift for the product significand. By using a predetermined mask pattern (showing the overflow position for an unshifted product significand) and shifting this in the opposite direction (right shifting) to the direction in which it is determined that the product significand will itself be (left) shifted, early overflow detection for the product significand is provided, given that this mask generation is able to be performed more quickly than the generation of the product significand. Hence, when the shift circuitry is engaged to perform either a left shift or a right shift on the product significand as required, the overflow mask can already be separately applied to the product significand to identify whether the relevant overflow bit is set (i.e. that overflow has occurred within the product significand). Hence this overflow can be taken into account when selecting the result of the shift which is applied to the product significand in order to format it for the predetermined canonical format in which the floating-point multiplication apparatus is generating its outputs.

The predetermined mask pattern may take a variety of forms, but in one embodiment the predetermined mask pattern comprises a set bit at an unshifted overflow bit position of the product significand when the product significand is unshifted. Thus this "set bit" may be identified and tracks the overflow bit position within the product significand both before shifting and then when the right shift is applied to the predetermined mask pattern, enabling the overflow bit position to be identified before any required shift to the product significand is applied.

The apparatus may be arranged to respond to an indication of overflow in a variety of ways, depending on how the output should be provided, but in some embodiments the apparatus further comprises overflow adjustment circuitry responsive to the overflow value indicating an overflow of the product significand to apply a one-bit right shift to the product significand and to increment a calculated exponent for result of the multiplication. Thus, it may be applicable to resolve the overflow of the product significand by right shifting it by one bit position and commensurately incrementing the exponent (whether biased or not) of the result of the multiplication, which functionality this overflow adjustment circuitry provides.

The shift circuitry provided in the apparatus may take a variety of forms, but in one embodiment comprises left shift circuitry to left shift the product significand by the shift amount to give a left-shifted product significand and right shift circuitry to right shift the product significand by the shift amount to give a right-shifted product significand, wherein the left shift circuitry and the right shift circuitry are arranged to perform their respective shifting in parallel with one another, and selection circuitry to select one of the left-shifted product significand and the right-shifted product significand in dependence on the shift direction. Accordingly, although it would also be possible to provide generic shift circuitry which could either left shift or right shift as required, the present techniques provide dedicated left shift circuitry and dedicated right shift circuitry which are arranged to perform their respective shifts in parallel with one another and subsequently selection circuitry then selects one of the results of these two shifts in dependence upon the identified shift direction to be applied. This parallelisation of the shifting further improves the speed with which the multiplication is carried out.

The apparatus for floating-point multiplication may itself be a stand-alone device only performing multiplication or may form part of (or at least be connected to) an addition apparatus such that the two can together be considered to form a fused multiply-add apparatus. In the latter case any rounding that may subsequently be performed on the product significand to generate the formatted output by the multiplier should not be applied to the product significand as supplied to the adder and accordingly in some embodiments the apparatus comprises a fused output to forward the product significand as an unrounded result value. Notably, in the present context this fused output can then be forwarded very quickly to the adder, because of the above described techniques by which the early overflow identification is enabled. In the case of a fused multiply-adder, the overall result of the multiply-addition can then also be commensurately quickly produced.

The floating-point multiplication apparatus may make use of the product significand in a number of ways. For example as discussed above, this may be directly output as a fused output for receipt by adder apparatus, or may be further processed within the floating-point multiplication apparatus. For example, where a degree of truncation of the product significand is required, this may further comprise applying a rounding, which may itself depend on a particular rounding mode in which the apparatus is set up to operate. Accordingly, in some embodiments, the apparatus further comprises result generation circuitry to generate a result significand of the floating-point multiplication comprising a predetermined number of most significant bits of the formatted significand, wherein the mask generation circuitry is further arranged to generate a last bit mask identifying a last bit position of a last bit of the result significand within the product significand and wherein the mask generation circuitry is arranged to generate the last bit mask by shifting a further predetermined mask pattern by the shift amount in an opposite direction to the shift direction; comparison circuitry to apply the last bit mask to the product significand to extract a last bit value at the last bit position; and rounding circuitry to generate a rounding value to be added to the result significand in dependence on a rounding mode of the apparatus and the last bit value.

When applying rounding to the product significand (whether formatted by an intermediate stage or not) it is necessary to identify at least one bit value at the least significant end of the range of bits selected for the result significand in order to determine how the rounding should be performed. However, the identification of this "last bit" also could in principle be delayed by the last bit position which holds this last bit only being identified after the product significand has been generated. However, the present techniques recognise that a similar technique to that described above with respect to identifying overflow using a shifted overflow mask may also be applied in this situation of identifying the last bit position, namely by setting up the mask generation circuitry such that it also generates a last bit mask identifying where this last bit position is within the product significand, wherein the last bit mask is generated by taking a preset mask pattern (showing where the last bit position is within an unshifted product significand) and then applying the opposite shift to this pattern to that which is calculated to be required for the product significand itself. In other words, where the exponent calculation circuitry determines that a left shift is required for the product significand of a given number of bits, the mask generation circuitry right shifts the last bit mask pattern by the same number of bits. Conversely, where a right shift is determined to be required by the exponent calculation circuitry, the mask generation circuitry left shifts the last bit mask pattern by the required number of bits. Comparison circuitry can then apply the (shifted) last bit mask to the product significand, before the product significand is itself shifted, to determine the last bit value at the last bit position and the rounding circuitry can then perform its rounding using this last bit value as appropriate to the rounding mode currently operational in the apparatus. As in the case above of the use of the overflow mask to identify overflow, the technique proposed herein with respect to the last bit mask allows an early determination of the last bit position (without waiting for the shift circuitry to perform its shift on the product significand) and the overall speed with which the last bit value can be extracted and passed to the rounding circuitry is thus improved.

The mask generation circuitry for the last bit mask may be provided in a variety of ways, but in some embodiments the mask generation circuitry is arranged to generate a left-shift last bit mask and a right-shift last bit mask, wherein the comparison circuitry is responsive to the shift direction being a left direction to extract the last bit value using the left-shift last bit mask and is responsive to the shift direction being a right direction to extract the last bit value using the right-shift last bit mask. Thus, whilst it would in principle be possible only to generate the last bit mask as appropriate to the shift direction required once the shift direction and size are established, the present techniques adopt a degree of parallelisation by generating both a left-shift last bit mask and a right-shift last bit mask in parallel with one and other, selecting between them in dependence on the shift direction when determined. This further increases the opportunity to reduce the time required for a rounded product to be generated by the apparatus, since these left-shift last bit masks and right-shift last bit masks can be prepared in advance.

As discussed above, the bit positions of the product significand also vary in dependence on whether the product significand has overflowed or not. This in consequence also affects the bit position of the last bit of the result significand. The apparatus could be configured to handle this in a number of ways, but in some embodiments the mask generation circuitry is arranged to generate two left-shift last bit masks, wherein the mask generation circuitry is arranged to generate a second left-shift last bit mask by right shifting by one bit a first left-shift last bit mask, and the mask generation circuitry is responsive to the overflow value indicating an overflow of the product significand to use the first left-shift last bit mask and is responsive to the overflow value indicating no overflow of the product significand to use the second left-shift last bit mask.

The present techniques recognise that a last bit mask generated for a left shift of the product significand (where it is recognised that it is a left shift of the product significand which could result in overflow) which is appropriate to use to identify the last bit in the case of overflow can be generated from a last bit mask appropriate to identify the last bit when there is no overflow, and vice versa, by a one-bit shift being applied to one to generate the other. Further, as in the case discussed above such masks can be generated in advance of the shift circuitry applying the required shift to the product significand and therefore this feature of the multiplication is not delayed, waiting for that shift to happen, and the overall processing speed of the multiplier is thus improved.

In some embodiments the further predetermined mask pattern comprises, when the shift direction is the left direction, an unset bit followed by a predetermined number of set bits, wherein the predetermined number of set bits is one more than the predetermined number of most significant bits of the formatted significand which gives the result significand, and the mask generation circuitry is arranged to generate the first left-shift last bit mask by right shifting the further predetermined mask pattern by the shift amount and prepending the first left-shift last bit mask with a number of unset bits given by the shift amount. Whilst the further predetermined mask pattern (used to identify the last bit position) could be defined in a number of ways, this configuration of an unset bit followed by set bits as defined above presents a bit pattern, after the shift has been applied, which usefully has unset bits (e.g. zeros) up to and including the last bit and set bits (e.g. ones) thereafter. For example in the case of producing the product of two 53-bit significands, resulting in a 105- or 106-bit product, this may then be a zero bit followed by 53 consecutive ones. When this bit pattern is right shifted, zeros fill in on the left. This particular configuration is not only useful for identifying the last bit position itself, but further to identify guard and sticky bit positions which may also be required for the rounding, in dependence on the rounding mode being applied. This is particularly the case because this shifted pattern can then easily be used to construct masks to pick out individually these last, guard and sticky bit positions.

Similarly, in some embodiments the further predetermined mask pattern comprises, when the shift direction is the right direction, a sequence of unset bits followed by a predetermined number of set bits, wherein the predetermined number of set bits is the predetermined number of most significant bits of the formatted significand, and the mask generation circuitry is arranged to generate the right-shift last bit mask by left shifting the further predetermined mask pattern by the shift amount and appending the right-shift last bit mask with a number of set bits given by the shift amount. In this instance, the particular unshifted pattern which has been found to be useful is a sequence of unset bits (e.g. zeros) followed by a sequence of set bits (e.g. ones), for example in the case of producing the product of two 53-bit significands, resulting in a 105- or 106-bit product, this may then be 55 consecutive zeros followed by 52 consecutive ones. When this bit pattern is left shifted, additional ones fill in on the right. Similarly, this enables not only the last bit to be readily identified, but enables the guard and sticky bit positions to readily be identified, through the use of further masks which may be generated from this shifted right-shift last bit mask.

As mentioned above, it may be required to identify a guard bit within the result significand and thus in some embodiments the mask generation circuitry is arranged to generate at least one guard bit mask, wherein the at least one guard bit mask has a bit set at a guard bit position which is one position below the position of the last bit of the result significand within the product significand, and the comparison circuitry is arranged to apply the guard bit mask to the product significand to extract a guard bit value at the guard bit position. The guard bit mask may for example be generated by inverting the last bit mask and then performing a bit-wise AND on this inverted last bit mask and the uninverted last bit mask, where the alignment of bits in each is selected such that the resulting output will usefully simply have a set bit (e.g. a one) where the guard bit is located and zeros elsewhere. Moreover, the present techniques further recognise that a further guard bit mask for the overflow case can be derived from this guard bit mask by applying a one-bit right shift. Equally, the present techniques also recognise that a still further guard bit mask for a to-be right shifted product significand can be produced by the same process of inverting a right shift last bit mask, aligning the two with a one-bit offset, and performing a bit-wise AND.

Similarly, in some embodiments the mask generation circuitry is arranged to generate at least one sticky bit mask, wherein the at least one sticky bit mask has bits set at all positions below the guard bit position, and the comparison circuitry is arranged to apply the sticky bit mask to the product significand to extract a set of sticky bit values and to calculate an overall sticky bit value as a logical OR of the set of sticky bit values. Thus, the sticky bit (or more typically sticky bits) of the result significand can then be identified by the use of this at least one sticky bit mask, which may for example simply be generated from the last bit mask by appropriate bit selection therefrom, for example where the last bit mask is generated from a further predetermined mask pattern which has set bits for all sticky bit positions, the present techniques ensure that these are correctly identified in the product significand by the opposite shift being applied and the at least one sticky bit mask can then directly identify all those sticky bit positions.

At least some embodiments provide a method of operating a data processing apparatus to perform floating-point multiplication comprising the steps of: multiplying significands of a first floating-point operand and a second floating-point operand to generate first and second partial products; adding the first and second partial products to generate a product significand; calculating a value of an unbiased exponent of a result of the multiplication in dependence on exponent values and leading zero counts of the first and second floating-point operands and determining a shift amount and a shift direction for the product significand in dependence on a predetermined minimum exponent value of a predetermined canonical format; shifting the product significand by a shift amount in the shift direction in order to generate a formatted significand in the predetermined canonical format; generating an overflow mask identifying an overflow bit position of the product significand, wherein generating the overflow mask comprises right shifting a predetermined mask pattern by the shift amount; and applying the overflow mask to the product significand to extract an overflow value at the overflow bit position, wherein the extraction of the overflow value in the applying step occurs before the shifting step shifts the product significand.

At least some embodiments provide an apparatus for apparatus for floating-point multiplication comprising: means for multiplying significands of a first floating-point operand and a second floating-point operand to generate first and second partial products; means for adding the first and second partial products to generate a product significand; means for calculating a value of an unbiased exponent of a result of the multiplication in dependence on exponent values and leading zero counts of the first and second floating-point operands and determining a shift amount and a shift direction for the product significand in dependence on a predetermined minimum exponent value of a predetermined canonical format; means for shifting the product significand by a shift amount in the shift direction in order to generate a formatted significand in the predetermined canonical format; means for generating an overflow mask identifying an overflow bit position of the product significand, wherein generating the overflow mask comprises right shifting a predetermined mask pattern by the shift amount; and applying the overflow mask to the product significand to extract an overflow value at the overflow bit position, wherein the means for applying the overflow mask is arranged to extract the overflow value before the means for shifting shifts the product significand.

Some particular embodiments will now be described with reference to the figures.

Floating-point numbers comprise a sign bit, exponent bits and fraction bits. For example a double precision (DP) floating-point number in IEEE 754-2008 format is given by 64 bits where these comprising a single sign bit, 11 exponent bits and 52 fraction bits. When performing a multiplication between two such floating-point numbers, the fraction bits must be multiplied together, whilst the exponent bits are added, but of course the outcome of the fraction bit multiplication can require amendment to the result exponent in dependence on the particular format in which the result floating-point value should be presented. It is useful for the floating-point result value to be produced, in this example, in the canonical DP floating-point format, wherein the significand (fraction) product is normalised (where possible) or with a number of leading zeros if the product is subnormal.

When multiplying two normal significands, 1.a*1.b, the product can be in the range [1, 2) (i.e. from exactly 1 up to, but not including, 2) or [2, 4) (i.e. from exactly 2, up to but not including 4). For example.

1.00*1.01=1.0100, which is in [1, 2) and has not overflowed, and 1.10*1.10=10.1000, which is in [2, 4) and has overflowed.

FIG. 1A shows two possible bit position outcomes for the product of two normal 53-bit significands, where the product will either be in the range [1, 2) and bit 105 of the product will be 0, or the product will be in the overflow range [2, 4) and bit 105 of the product will be 1. The first bit of the product is labelled i (integer bit), and the next 51 bits are labelled f (fraction bits). The final fraction bit is labelled L (last bit), the bit following that is G (guard bit), and all remaining bits are labelled s (sticky bits). A single binary value S is defined to be the logical OR of all of the s bits. In other words. L is the least significant bit of the truncated value when this 105 or 106-bit product is returned as a 53-bit floating-point significand, G is the next most significant bit (i.e. the first bit not included in truncation) and S is the logical OR of all remaining bits that are not part of the truncation. These three values enable the truncated value to be correctly rounded in dependence on the particular rounding mode being implemented in a manner with which of one or ordinary skill in the art will be familiar and is not described in further detail here.

FIG. 1B shows the bit positions of these named bits in the case where one of the input operands is subnormal, with k leading zeros. As can be seen in FIG. 1B there will be k leading zeros in non-overflow products and k−1 leading zeros in overflow products. Accordingly, it will be appreciated from FIGS. 1A and 1B, and the above description referring to these figures, that in a floating-point multiplier which accepts input operands which may be normalised or may be subnormal, the bit positions at which the above mentioned particular bits (i, f, L, G and s) occur can widely vary depending on the nature of the input operands (normal or subnormal) and depending on whether the product significand overflows. Note that the case in which both input operands are subnormal is trivial in the present context since this produces an unrepresentedly tiny product because the associated exponent (in this DP example) is −2044 and the final result is determined purely by the rounding mode.

The above discussion referring to FIGS. 1A and 1B only considers the floating-point input operand significands and has not made reference to the exponents. Defining:

expa=unbiased exponent of operand a,
expb=unbiased exponent of operand b,
clza=number of leading zeros in the significand of a,
clzb=number of leading zeros in the significand of b,
and letting clz be the logical OR of clza and clzb, then the unbiased result exponent before shifting is result_exp=expa+expb−*clz*.

Based on this calculated result exponent, the 106-bit product significand may require shifting so that bits [105:0] represent the product in a canonical form, either normalised if the product is normal, or with the correct number of leading zeros if the product is subnormal. This shifting could be in either direction namely:

1) a right shift when result_exp is below the minimum unbiased exponent value of −1022. In all such cases the product significand is right shifted by one or more places in order to reach the minimum unbiased exponent value of −1022.
2) a left shift, when there is one subnormal input and result_exp is greater than −1022. In this situation the product significant is shifted by zero or more places until either (whichever happens first) a) the exponent corresponding to the shifted value is equal to −1022, or b) the product significand becomes normal (i.e. the i bit is in position 104). Note also that for the left shifted result a 1-bit significand adjustment and corresponding exponent increase is required if this left-shifted result has overflowed.

Thus, in the floating-point multiplier (which outputs result values in the canonical DP format) the latter overflow case will be normalised (right shifted by 1 bit position with a corresponding exponent increment) in order to return the product in the desired format.

FIG. 2 schematically illustrates floating-point multiplier apparatus 10 in one embodiment. Operand "a" opa[63:0] (labelled 12) consists of sign bit signa, exponent bits expa [10:0], and fraction bits fraca[51:0], with a similar breakdown for operand "b" opb[63:0] (labelled 14). In the first stage (cycle) V1, fraca and fracb are multiplied together in a 52×52 array 16, after which the 52 partial products are reduced to two (106-bit) partial products using 3:2 compressors.

While the reduction is proceeding, exponent calculation circuitry 20 examines expa and expb to see if they are non-zero. Non-zero expa means that the implied integer bit of a is set, and in this case the exponent calculation circuitry 20 signals to the reduction array (part 18) that another factor of fracb is to be added into the reduction. Similarly non-zero expb means that the implied integer bit of b is set, and so in this event another factor of fraca is added into the reduction. Finally, a single bit corresponding to the product of the implied integer bits is added into the reduction array 18. While the array reduction proceeds, a count leading zero (CLZ) operation is also performed by the exponent calculation circuitry 20 on the significands of opa and opb, and the product exponent and shift amounts (described later) are computed.

In the second stage (cycle) V2, the two (106-bit) partial products held in registers 22 are added by the adder circuit 24, and masks based on shift amounts are constructed by the mask generation circuit 26. As described above, these masks are used for early detection of overflow and rounding information (and more detail of this is given later). The generated masks are applied directly to the partial product sum before the sum is shifted by the left and right shifters 28 and 30. This application of the generated masks to the partial product sum is performed by the comparison circuitry 32. The sum is then shifted by left and right shifters 28 and 30, by the respective shift distances held in registers 34 and 36. Multiplexer 38 selects between the left-shifted and right-shifted sum in dependence on the rs/ls signal received from the exponent calculation circuitry 20. If an overflow is indicated by the comparison circuitry 32 then a 1-bit right shifted (1-bit RS) version of the left-shifted sum is selected. The multiplexer 38 is also capable of selecting a predefined "special" value, which is selected when a particular defined output is determined to be required (such a NaN, an infinity, or zero). From the multiplexer 38, if the operation is a fused multiply-add (FMA), the shifted 106-bit product is passed ("fused output") to a floating-point adder (not shown). If the operation is a multiply rather than an FMA, the unrounded top 52 fraction bits are stored in register 40, along with a 1-bit indicator "round" (in register 42) of whether the stored fraction has to be incremented for rounding.

In the third stage (cycle) V3 the "round" bit is added to the product fraction in order to round it by increment adder 44, and the final floating-point product is constructed from the pre-computed sign and exponent and the rounded fraction. A final multiplexer 46 chooses the floating-point number or a pre-computed special value (e.g., infinity or NaN or zero). Note also that in order to round at the beginning of stage V3, L, G, and S are computed in V2. This is done using two sets of masks, again shifting in the opposite direction and for the same distance as the product: right shifted masks for left shifted products, and left shifted masks for right shifted products. The generation of these masks (by mask generation circuit 26) and their application (by comparison circuitry 32) is explained in more detail with reference to the figures that follow.

The overview of the floating-point multiplier apparatus 10 shown in FIG. 2, with the cycle boundaries illustrated, allows an appreciation of the impact of the present techniques in that the early detection of the overflow means that the correct unrounded result can be forwarded to the adder (for the purpose of FMAs) in less than two cycles, and that the rounded FMUL result can be forwarded in less than 2.5 cycles.

Figure 3:
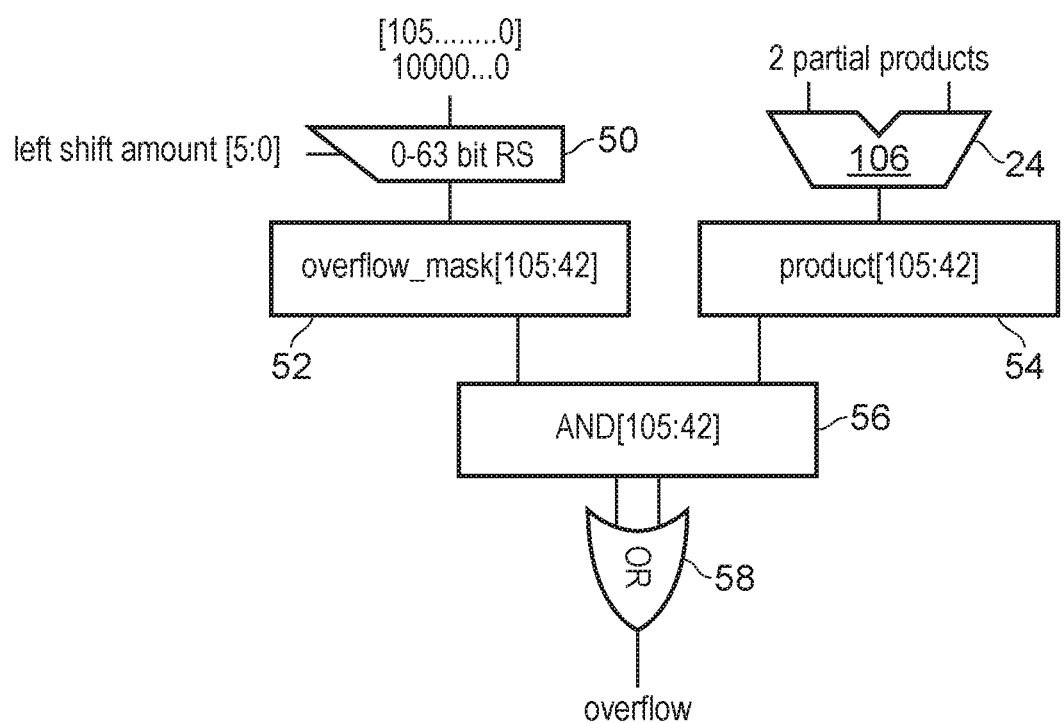
FIG. 3 schematically illustrates circuitry for determining whether an overflow of the product significand has occurred in one embodiment.

FIG. 3 schematically illustrates the overflow determination by the V2 overflow mask logic (represented by mask generation circuit 26 and comparison circuitry 32 in FIG. 2). The overflow mask is initially constructed consisting of a single 1 at position 105 and zeros in the remaining bits. The overflow mask is then right shifted (by right-shifter 50) by exactly the same amount that the product will be left shifted. This right shifting happens well before the 106-bit product is produced (by the adder circuit 24), and the overflow is detected by a logical AND 56 of the mask 52 with the product 54, followed by a reduction OR 58. This allows the detection of the overflow before the left shifting of the product (by the left shifter 28) has completed. The Verilog version of the FIG. 3 logical circuitry is:

ls_overflow_e2=|(ovfl_mask[105:42]& prod_v2[105:42]);

Notice that not all bits of the product are examined, because the maximum amount of left shifting is restricted to 63 (and in practice to 52, because that is the maximum leading zero count for a subnormal input).

There are three sets of masks for computing rounding, the generation and use of which are now discussed with reference to FIGS. 4, 5 and 6. The starting mask patterns for each of these sets are referred to here as: left_overflow (lomask), left non-overflow (lmask) and right (rmask).

Figure 4:
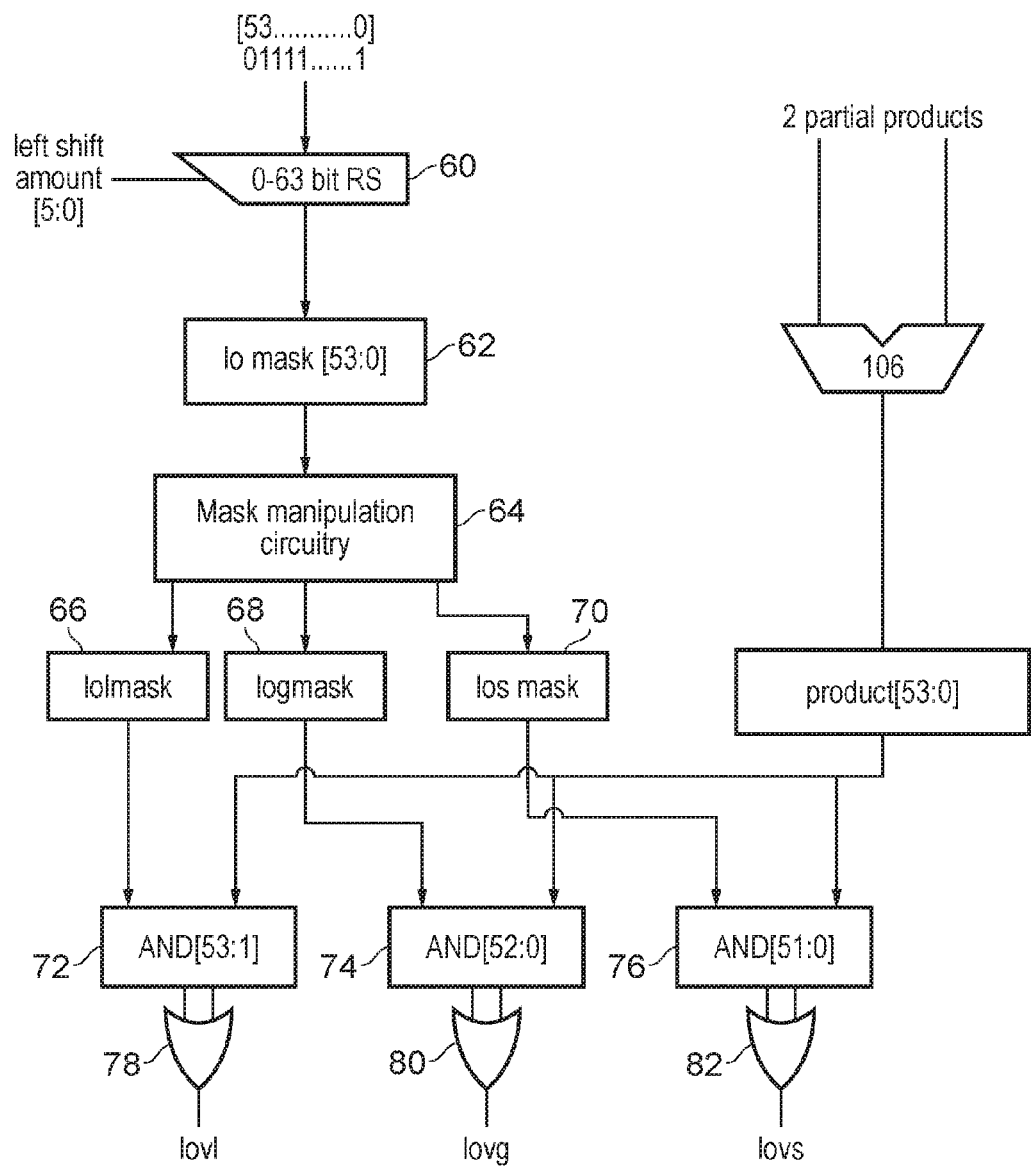
FIG. 4 schematically illustrates circuitry for the determination of last, guard and sticky bits used when the product significand is to be left shifted and overflows in one embodiment.
Figure 5:
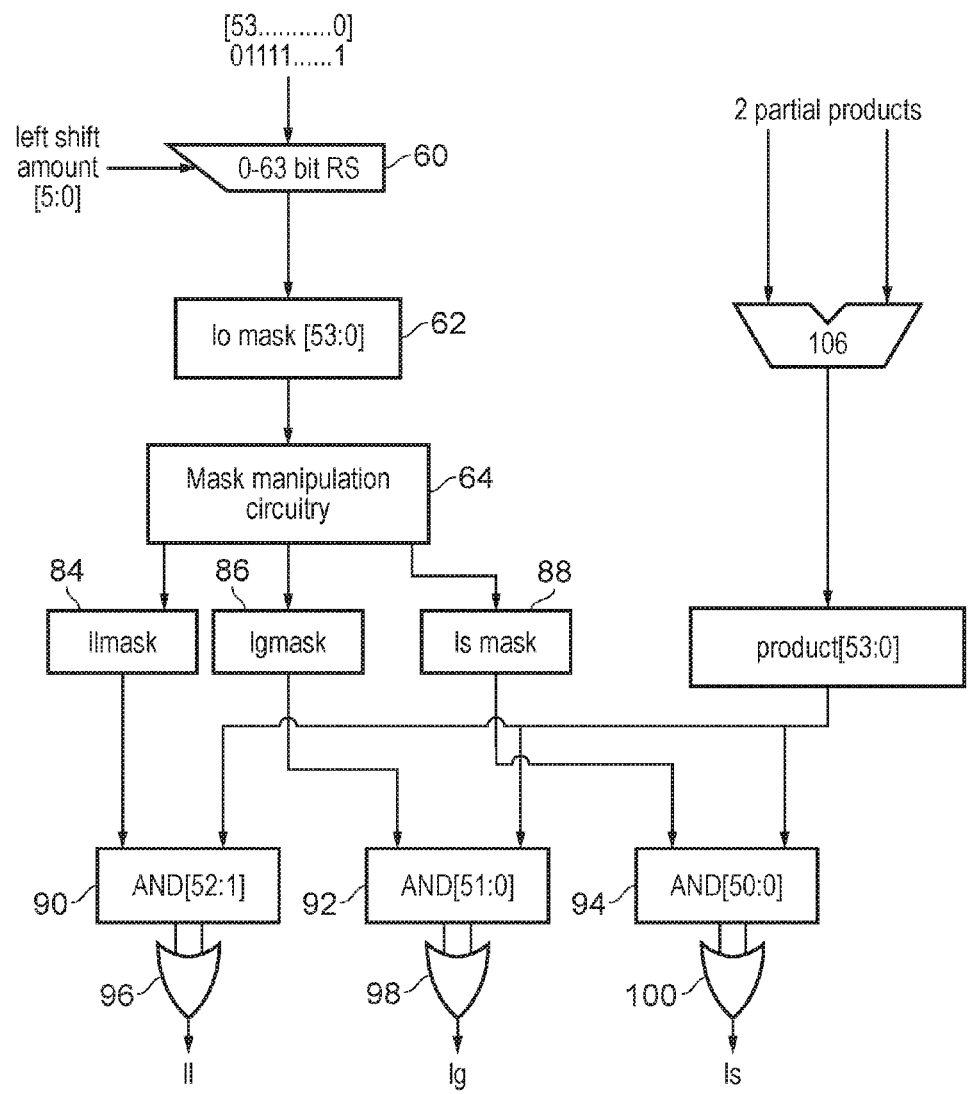
FIG. 5 schematically illustrates circuitry for determining the last, guard and sticky bits used when the product significand is to be left shifted and does not overflow in one embodiment.

FIG. 4 illustrates the left shift overflow case, where the initial mask pattern is initialized to a zero bit followed by 53 consecutive ones, and the mask is then right shifted (by right shifter 60) by the left shift amount, with zeros filling in on the left. This generates the 54-bit mask lomask[53:0] that has zeros up to and including the L bit, and ones at the G and S positions. From this specific masks are constructed by the mask manipulation circuitry 64 to pick out L, G, and S. The corresponding Verilog versions as implemented by the mask manipulation circuitry 64 are:

log mask[52:0]=~lomask[53:1]& lomask[52:0];

such that log mask 68 has a one where the G bit is located and zeros elsewhere;

lolmask[53:1]=log mask[52:0];

such that lolmask 66 has a one where the L bit is located and zeros elsewhere; and losmask[51:0]=lomask[52:1];

such that losmask 70 has ones at every sticky bit position and zeros elsewhere.

Figure 6:
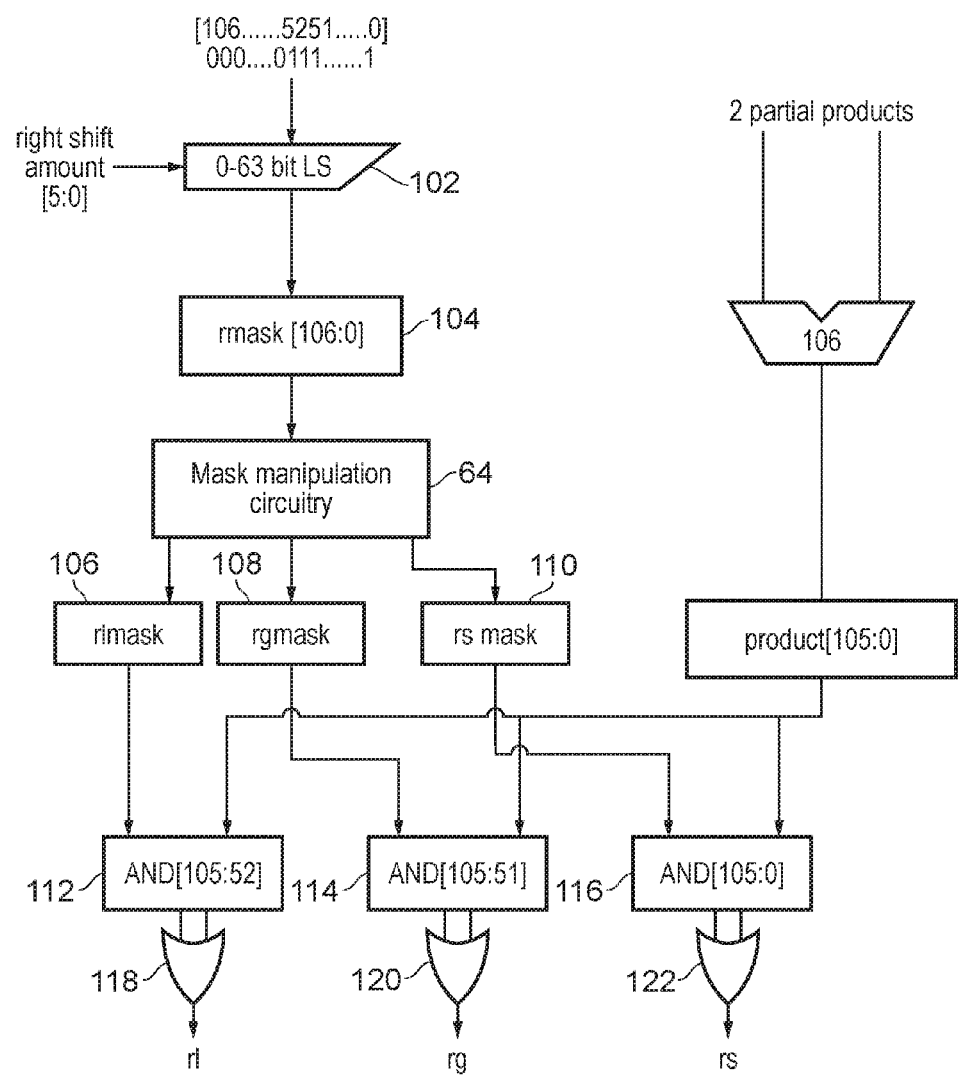
FIG. 6 schematically illustrates circuitry used to determine the last, guard and sticky bits when the product significand is to be right shifted in one embodiment.
Figure 7A:
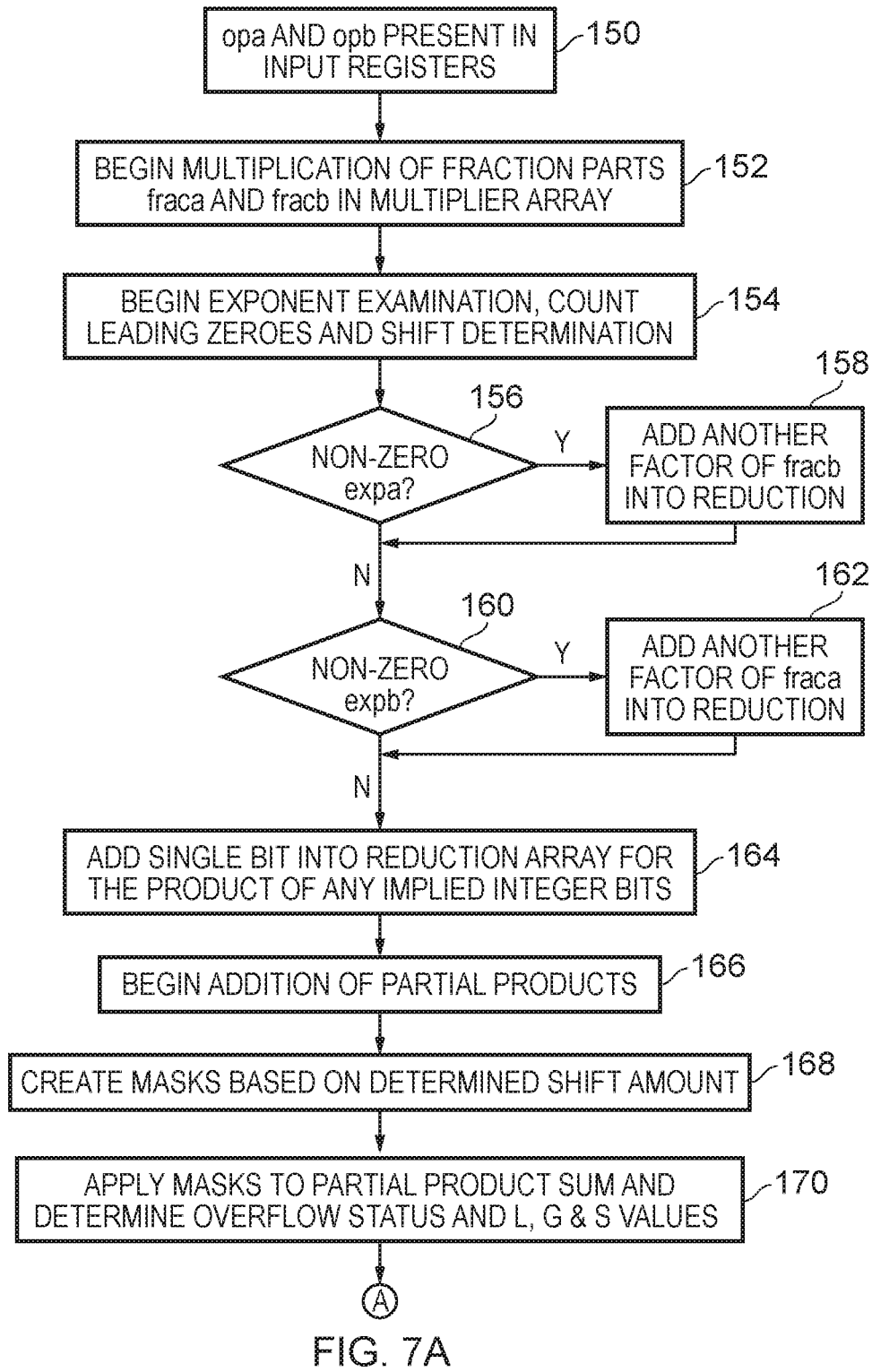
FIGS. 7A and 7B show a sequence of steps which are taken when carrying out the method according to one embodiment.
Figure 7B:
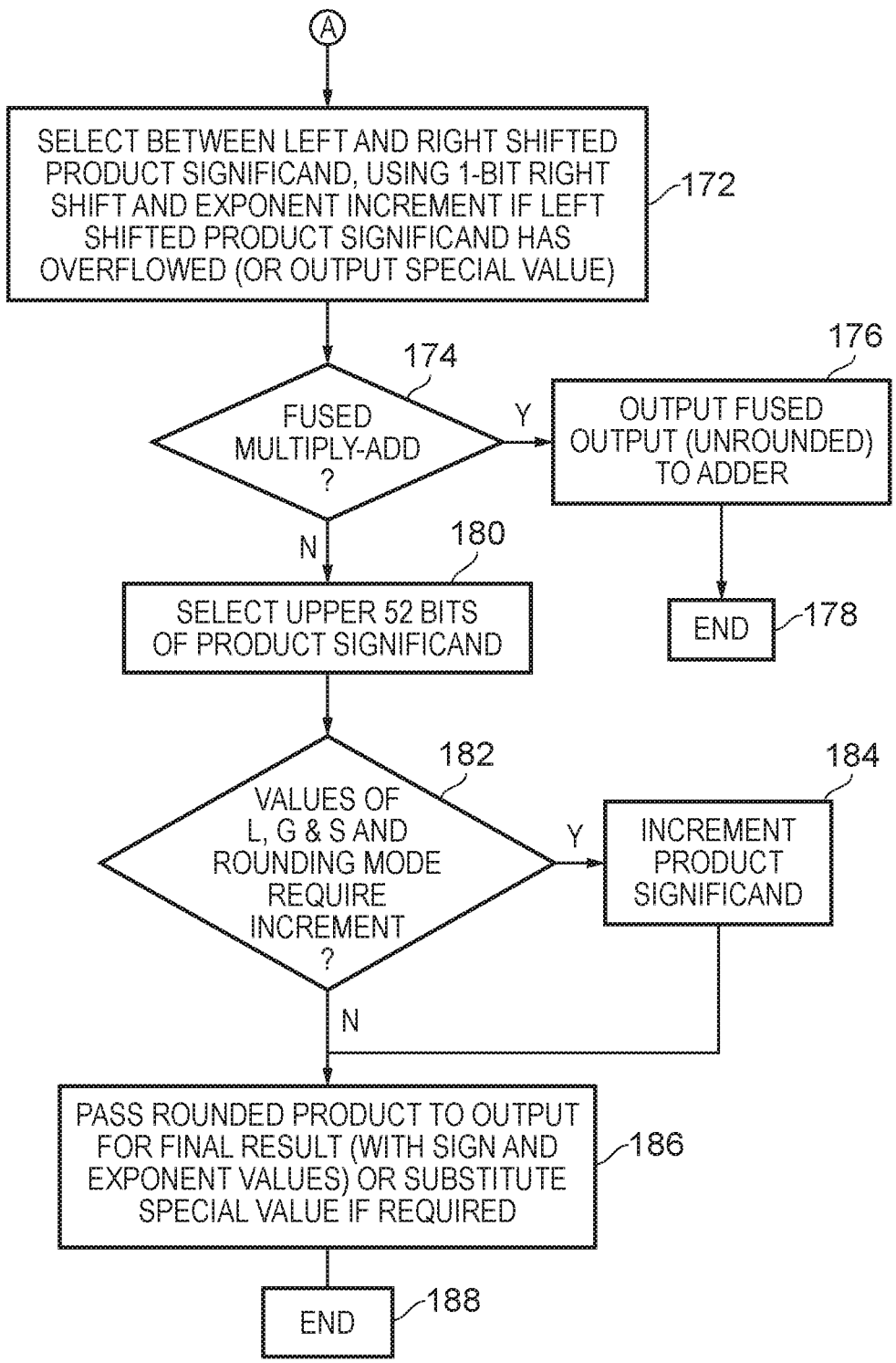

These masks are applied directly by AND circuitry 72, 74 and 76 to the product to get (from the OR gates 78, 80 and 82) L, G, and S for left shifted overflow products. The corresponding Verilog versions are:

lovl=|(lolmask[53:1]&prod_v2[53:1]);//left overflow L lovg=|(log mask[52:0]&prod_v2[52:0]);//left overflow G lovs=|(losmask[51:0]&prod_v2[51:0]);//left overflow S The masks for the non-overflow left shift cases are created from the left shift overflow masks shifted one bit more to the right. This is illustrated in FIG. 5, where it can be seen that the mask manipulation circuitry 64 generates llmask 84, lgmask 86 and lsmask 88, this being done by shifting the corresponding left shift overflow masks according to the following Verilog:

llmask[52:1]=lolmask[53:2];

lgmask[51:0]=log mask[52:1];

lsmask[50:0]=losmask[51:1];

In the final stage, these masks are applied directly by AND circuitry 90, 92 and 94 to the product to get (from the OR gates 96, 98 and 94) L, G, and S for left shifted non-overflow products. The corresponding Verilog versions are:

ll=|(llmask[52:1]&prod_v2[52:1]);//left L lg=|(lgmask[51:0]&prod_v2[51:0]);//left G ls=|(lsmask[50:0]&prod_v2[50:0]);//left S FIG. 6 shows the construction and use of the right shift masks. The product is to be shifted right by a right shift amount, and to compute L. G, and S a mask is constructed that is left shifted by that same amount. The initial right mask is 55 consecutive zeros followed by 52 consecutive ones, and this mask is left shifted (by left shifter 102) by the right shift amount, filling in additional ones on the right, yielding rmask[106:0] 104. From this specific masks 106, 108 and 110 are constructed by the mask manipulation circuitry 64 to pick out L, G, and S. The corresponding Verilog versions as implemented by the mask manipulation circuitry 64 are:

rgmask[105:51]=~rmask[106:52]& rmask[105:51];

rlmask[105:52]=rgmask[104:51];

rsmask[105:0]=rmask[106:1];

and L, G, and S are computed the same way as in the left shift cases by AND circuitry 112, 114 and 116 applying these masks to the product to get (from the OR gates 118, 120 and 122) L, G, and S for right shifted products. The corresponding Verilog versions are:

rl=|(rlmask[105:52]&prod_v2[105:52]);//right L rg=|(rgmask[105:51]&prod_v2[105:51]);//right G rs=|(rsmask[105:0]&prod_v2[105:0]);//right S FIGS. 7A and 7B show a sequence of steps which are taken in the method of one embodiment. The flow can be considered to begin at step 150 where input operands opa and opb are present in the input registers. Then at step 152 multiplication of the fraction parts fraca and fracb begins in the multiplier array. At the same time (at step 154) examination of the exponent parts of the operands begins to determine the unbiased exponent of each operand and the leading zero count of each, such that a determination of the shift that will be required can be made. At step 156 it is determined if opa has a non-zero exponent and if it does then the flow proceeds via step 158, where another factor of fracb is added into the reduction array. Similarly, at step 160 it is determined if opb has a non-zero exponent and if it does the flow proceeds via step 162, where another factor of fraca is added into the reduction array. Finally, at step 164, a single bit is added into the reduction array for the product of any implied integer bits. At step 166 the addition of the partial products generated by the multiplier/reduction array begins and at step 168 masks are created based on the determined shift amount required, i.e. preset mask patterns are shifted in the opposite direction to the shift direction required for the significand. At step 170 these masks are applied to the partial product sum in order to determine the overflow status and the L, G and S values for this multiplication operation. Then, at step 172 in dependence on the determined shift direction it is selected between the left and right shifted product significand, using a one-bit right shift and exponent increment if the left shifted product significand has overflowed (as indicated by the overflow value). Alternatively, in the case of a special value being required to be output (for example representing NaN, infinity, or zero) then a special significand value is selected. At step 174 it is determined whether this operation is a pure multiply, or a fused multiple-add. If it is the latter then the flow proceeds to step 176, where the unrounded significand is output to the adder and the flow ends at step 178. If however, this is a pure multiplication, then the flow proceeds to step 180 where the upper 52-bits of the product significand are selected in order to generate the result significand for the multiplication and at step 182 the values of L, G and S (together with the rounding mode of the apparatus currently being implemented) are examined in order to determine if this sequence requires incrementing. If it does, the flow proceeds via step 184. Finally, at step 186 the rounded product is passed as an output (or a special value is substituted) for the final result to be created. The flow ends at step 188.

In brief overall summary of the present techniques an apparatus and method for floating-point multiplication are provided. Two partial products are generated from two operand significands, which are then added to generate a product significand. The value of an unbiased result exponent is determined from the operand exponent values and leading zero counts, and a shift amount and direction for the product significand are determined in dependence on a predetermined minimum exponent value of a predetermined canonical format. The product significand is shifted by the shift amount in the shift direction. An overflow mask identifying an overflow bit position of the product significand is generated by right shifting a predetermined mask pattern by the shift amount, and the overflow mask is applied to the product significand to extract an overflow value at the overflow bit position. This extraction of the overflow value happens before the shift circuitry shifts the product significand, allowing an overall faster floating-point multiplication to be performed.

In the present application, the words "configured to . . . " or "arranged to" are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" or "arranged to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

I claim:

1. Apparatus for floating-point multiplication comprising:
   partial product generation circuitry to multiply significands of a first floating-point operand and a second floating-point operand to generate first and second partial products;
   adder circuitry to add the first and second partial products to generate a product significand;
   exponent calculation circuitry to calculate a value of an unbiased exponent of a result of the multiplication in dependence on exponent values and leading zero counts of the first and second floating-point operands and to determine a shift amount and a shift direction for the product significand in dependence on a predetermined minimum exponent value of a predetermined canonical format;
   shift circuitry to shift the product significand by the shift amount in the shift direction in order to generate a formatted significand in the predetermined canonical format;
   mask generation circuitry to generate an overflow mask identifying an overflow bit position of the product significand, wherein the mask generation circuitry is arranged to generate the overflow mask by right shifting a predetermined mask pattern by the shift amount; and comparison circuitry to apply the overflow mask to the product significand to extract an overflow value at the overflow bit position, wherein the comparison circuitry is arranged to extract the overflow value before the shift circuitry shifts the product significand.

2. The apparatus as claimed in claim 1, wherein the predetermined mask pattern comprises a set bit at an unshifted overflow bit position of the product significand when the product significand is unshifted.

3. The apparatus as claimed in claim 1, further comprising overflow adjustment circuitry responsive to the overflow value indicating an overflow of the product significand to apply a one-bit right shift to the product significand and to increment a calculated exponent for result of the multiplication.

4. The apparatus as claimed in claim 1, wherein the shift circuitry comprises:
 left shift circuitry to left shift the product significand by the shift amount to give a left-shifted product significand and right shift circuitry to right shift the product significand by the shift amount to give a right-shifted product significand, wherein the left shift circuitry and the right shift circuitry are arranged to perform their respective shifting in parallel with one another; and
 selection circuitry to select one of the left-shifted product significand and the right-shifted product significand in dependence on the shift direction.

5. The apparatus as claimed in claim 1, comprising a fused output to forward the product significand as an unrounded result value.

6. The apparatus as claimed in claim 1, further comprising:
 result generation circuitry to generate a result significand of the floating-point multiplication comprising a predetermined number of most significant bits of the formatted significand,
 wherein the mask generation circuitry is further arranged to generate a last bit mask identifying a last bit position of a last bit of the result significand within the product significand and wherein the mask generation circuitry is arranged to generate the last bit mask by shifting a further predetermined mask pattern by the shift amount in an opposite direction to the shift direction;
 comparison circuitry to apply the last bit mask to the product significand to extract a last bit value at the last bit position; and
 rounding circuitry to generate a rounding value to be added to the result significand in dependence on a rounding mode of the apparatus and the last bit value.

7. The apparatus as claimed in claim 6, wherein the mask generation circuitry is arranged to generate a left-shift last bit mask and a right-shift last bit mask, wherein the comparison circuitry is responsive to the shift direction being a left direction to extract the last bit value using the left-shift last bit mask and is responsive to the shift direction being a right direction to extract the last bit value using the right-shift last bit mask.

8. The apparatus as claimed in claim 7, wherein the mask generation circuitry is arranged to generate two left-shift last bit masks, wherein the mask generation circuitry is arranged to generate a second left-shift last bit mask by right shifting by one bit a first left-shift last bit mask, and
 the mask generation circuitry is responsive to the overflow value indicating an overflow of the product significand to use the first left-shift last bit mask and is responsive to the overflow value indicating no overflow of the product significand to use the second left-shift last bit mask.

9. The apparatus as claimed in claim 8, wherein the further predetermined mask pattern comprises, when the shift direction is the left direction, an unset bit followed by a predetermined number of set bits, wherein the predetermined number of set bits is one more than the predetermined number of most significant bits of the formatted significand which gives the result significand, and
 the mask generation circuitry is arranged to generate the first left-shift last bit mask by right shifting the further predetermined mask pattern by the shift amount and prepending the first left-shift last bit mask with a number of unset bits given by the shift amount.

10. The apparatus as claimed in claim 7, wherein the further predetermined mask pattern comprises, when the shift direction is the right direction, a sequence of unset bits followed by a predetermined number of set bits, wherein the predetermined number of set bits is the predetermined number of most significant bits of the formatted significand, and
 the mask generation circuitry is arranged to generate the right-shift last bit mask by left shifting the further predetermined mask pattern by the shift amount and appending the right-shift last bit mask with a number of set bits given by the shift amount.

11. The apparatus as claimed in claim 6, wherein the mask generation circuitry is arranged to generate at least one guard bit mask, wherein the at least one guard bit mask has a bit set at a guard bit position which is one position below the position of the last bit of the result significand within the product significand, and the comparison circuitry is arranged to apply the guard bit mask to the product significand to extract a guard bit value at the guard bit position.

12. The apparatus as claimed in claim 11, wherein the mask generation circuitry is arranged to generate at least one sticky bit mask, wherein the at least one sticky bit mask has bits set at all positions below the guard bit position, and the comparison circuitry is arranged to apply the sticky bit mask to the product significand to extract a set of sticky bit values and to calculate an overall sticky bit value as a logical OR of the set of sticky bit values.

13. A method of operating a data processing apparatus to perform floating-point multiplication comprising the steps of:
 multiplying, by partial product generation circuitry, significands of a first floating-point operand and a second floating-point operand to generate first and second partial products;
 adding, by adder circuitry, the first and second partial products to generate a product significand;
 calculating, by exponent calculation circuitry, a value of an unbiased exponent of a result of the multiplication in dependence on exponent values and leading zero counts of the first and second floating-point operands and determining a shift amount and a shift direction for the product significand in dependence on a predetermined minimum exponent value of a predetermined canonical format;
 shifting, by shift circuitry, the product significand by a shift amount in the shift direction in order to generate a formatted significand in the predetermined canonical format;
 generating, by mask generation circuitry, an overflow mask identifying an overflow bit position of the product significand, wherein generating the overflow mask comprises right shifting a predetermined mask pattern by the shift amount; and applying the overflow mask to the product significand to extract an overflow value at the overflow bit position, wherein the extraction of the overflow value in the applying step occurs before the shifting step shifts the product significand.

14. Apparatus for floating-point multiplication comprising:

means for multiplying significands of a first floating-point operand and a second floating-point operand to generate first and second partial products;

means for adding the first and second partial products to generate a product significand;

means for calculating a value of an unbiased exponent of a result of the multiplication in dependence on exponent values and leading zero counts of the first and second floating-point operands and determining a shift amount and a shift direction for the product significand in dependence on a predetermined minimum exponent value of a predetermined canonical format;

means for shifting the product significand by a shift amount in the shift direction in order to generate a formatted significand in the predetermined canonical format;

means for generating an overflow mask identifying an overflow bit position of the product significand, wherein generating the overflow mask comprises right shifting a predetermined mask pattern by the shift amount; and means for applying the overflow mask to the product significand to extract an overflow value at the overflow bit position, wherein the means for applying the overflow mask is arranged to extract the overflow value before the means for shifting shifts the product significand.

* * * * *